(12) United States Patent
Fleck et al.

(10) Patent No.: US 8,983,555 B2
(45) Date of Patent: Mar. 17, 2015

(54) WIRELESS COMMUNICATION TECHNIQUES

(75) Inventors: Rod G. Fleck, Bellevue, WA (US); Jedd A. Perry, Monroe, WA (US); Peter S. Hoang, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 13/089,071

(22) Filed: Apr. 18, 2011

(65) Prior Publication Data

US 2012/0178368 A1 Jul. 12, 2012

Related U.S. Application Data

(60) Provisional application No. 61/430,639, filed on Jan. 7, 2011, provisional application No. 61/431,312, filed on Jan. 10, 2011.

(51) Int. Cl.
*H04M 1/00* (2006.01)
*H04B 1/38* (2006.01)
(Continued)

(52) U.S. Cl.
CPC ......... *H04N 7/0806* (2013.01); *H04W 52/0274* (2013.01); *H04L 5/0007* (2013.01);
(Continued)

(58) Field of Classification Search
USPC ............................ 455/41.2, 552.1, 553.1, 574
See application file for complete search history.

(56) References Cited

U.S. PATENT DOCUMENTS

| | | | |
|---|---|---|---|
| 7,053,863 B2 | 5/2006 | Glen et al. | |
| 7,110,783 B2 | 9/2006 | Bahl et al. | |

(Continued)

FOREIGN PATENT DOCUMENTS

| | | |
|---|---|---|
| CN | 1262844 | 8/2000 |
| CN | 101453222 | 6/2009 |

(Continued)

OTHER PUBLICATIONS

"PCT Search Report and Written Opinion", Application No. PCT/US2012/020348, (Aug. 29, 2012), 11 pages.
(Continued)

*Primary Examiner* — Ping Hsieh
(74) *Attorney, Agent, or Firm* — Judy Yee; Micky Minhas; Wolfe-SBMC

(57) ABSTRACT

Wireless communication techniques are described. In one or more implementations, techniques are described that involve active power control such that a device may bypass use of a power amplifier to communicate wirelessly. In one or more additional implementations, wireless communication techniques are described in which multiple bands may be leveraged to provide wireless communication. In one or more further implementations, wireless communication techniques are described in which a frame buffer on a receiving device is leveraged by a sending device. Yet further, in one or more implementations wireless communication techniques are described in which a sending device employs codec adaptation. Still yet further, in one or more implementations, wireless communication techniques are described which may be used to change characteristics of a channel used to communicate data. Yet further again, in one or more implementations, a receiving device is configured to adjust a display based on wireless communications received from a plurality of devices, such as to leverage a display by multiple wireless sources.

20 Claims, 11 Drawing Sheets

(51) Int. Cl.
*H04N 7/08* (2006.01)
*H04W 52/02* (2009.01)
*H04L 5/00* (2006.01)
*H04W 52/24* (2009.01)
*H04W 84/12* (2009.01)
*H04W 84/18* (2009.01)

(52) U.S. Cl.
CPC ........... *H04L 5/0053* (2013.01); *H04W 52/241* (2013.01); *H04W 52/247* (2013.01); *H04W 84/12* (2013.01); *H04W 84/18* (2013.01)
USPC ...................... 455/574; 455/552.1; 455/41.2

(56) References Cited

U.S. PATENT DOCUMENTS

| | | | |
|---|---|---|---|
| 7,436,790 | B2 | 10/2008 | Todd et al. |
| 7,440,728 | B2 * | 10/2008 | Abhishek et al. ............ 455/41.2 |
| 7,729,382 | B2 | 6/2010 | Rosner et al. |
| 8,095,091 | B1 * | 1/2012 | Kopikare ................... 455/127.1 |
| 8,121,570 | B2 * | 2/2012 | Ibrahim et al. ................ 455/205 |
| 8,351,882 | B2 * | 1/2013 | Harel et al. ................ 455/127.3 |
| 8,396,003 | B2 | 3/2013 | Leinonen et al. |
| 2004/0246383 | A1 | 12/2004 | Alden |
| 2005/0170779 | A1 | 8/2005 | Tangonan et al. |
| 2006/0205401 | A1 | 9/2006 | Palin et al. |
| 2007/0109155 | A1 | 5/2007 | Fallon |
| 2007/0263587 | A1 | 11/2007 | Savoor et al. |
| 2007/0268880 | A1 | 11/2007 | Bellur et al. |
| 2008/0002672 | A1 | 1/2008 | Lin |
| 2008/0058031 | A1 | 3/2008 | Deprun |
| 2009/0168650 | A1 * | 7/2009 | Kesselman ................... 370/235 |
| 2009/0180451 | A1 | 7/2009 | Alpert et al. |
| 2009/0225810 | A1 | 9/2009 | Sugaya |
| 2009/0327918 | A1 | 12/2009 | Aaron et al. |
| 2010/0008348 | A1 | 1/2010 | Zhang et al. |
| 2010/0172276 | A1 | 7/2010 | Aragon |
| 2010/0233975 | A1 | 9/2010 | Wu et al. |
| 2010/0291975 | A1 | 11/2010 | Dimpflmaier et al. |
| 2010/0322334 | A1 | 12/2010 | Wang et al. |
| 2011/0001879 | A1 | 1/2011 | Goldey et al. |
| 2011/0250928 | A1 * | 10/2011 | Schlub et al. ............. 455/550.1 |
| 2012/0015605 | A1 * | 1/2012 | Sole ............................ 455/41.3 |
| 2012/0178380 | A1 | 7/2012 | Fleck et al. |
| 2013/0293689 | A1 | 11/2013 | Fleck |

FOREIGN PATENT DOCUMENTS

| | | |
|---|---|---|
| CN | 100511314 | 7/2009 |
| CN | 101472338 | 7/2009 |
| CN | 1728713 | 9/2010 |

OTHER PUBLICATIONS

Pering, et al., "Coolspots: reducing the power consumption of wireless mobile devices with multiple radio interfaces", Retrieved at << http://www.usenix.org/events/mobisys06/full_papers/p220-pering.pdf >>, The 4th International Conference on Mobile Systems, Applications and Services, Jun. 19-22, 2006, pp. 220-232.

Gupta, et al., "Power Consumption and Conservation in WiFi Based Phones: A Measurement-Based Study", Retrieved at << http://www.cs.ucdavis.edu/~prasant/pubs/conf/secon-07.pdf >>, In 4th Annual IEEE Communications Society Conference on Sensor, Mesh and Ad Hoc Communications and Networks, 2007, pp. 1-10.

"International Search Report", Mailed Date: Aug. 9, 2012, Application No. PCT/US2012/020340, Filed Date: Jan. 5, 2012, pp. 11.

"Avago Technologies Ships Industry's First Active Bypass Power Amplifiers Which Dramatically Improve Low Power Efficiency", Retrieved from: <http://www.avagotech.com/pages/en/press/avago_technologies_ships_industrys_first_active_bypass_power_amplifiers_which_dramatically_improve_low_power_efficiency/> on Jul. 4, 2011,(Feb. 11, 2008),1 page.

"Non-Final Office Action", U.S. Appl. No. 13/088,986, (Dec. 12, 2012), 9 pages.

"Final Office Action", U.S. Appl. No. 13/088,986, Apr. 18, 2013, 8 pages.

"Foreign Office Action", CN Application No. 201210012153.9, Dec. 10, 2013, 14 pages.

"Foreign Office Action", CN Application No. 201210012153.9, May 19, 2014, 10 pages.

"Foreign Office Action", CN Application No. 201210012153.9, Sep. 1, 2014, 14 Pages.

"Foreign Office Action", CN Application No. 201210012116.8, Nov. 21, 2014, 12 Pages.

"Foreign Office Action", CN Application No. 201210012153.9, Jan. 19, 2015, 7 Pages.

* cited by examiner

300

302
Detect by a sending device whether communications between a receiving device and a sending device comply with a predefined link quality

304
Responsive to a determination that the communications comply with the predefined link quality, bypass a power amplifier of the sending device to transmit a wireless communication to be received by the sending device

306
Responsive to a determination that the communications do not comply with the predefined link quality, using the power amplifier of the sending device to transmit a wireless communication to be received by the sending device

308
Receiving a wireless communication by the receiving device from the sending device that was communicated without using the power amplifier of the sending device when the communications comply with a predefined link quality

310
Receiving a wireless communication by the receiving device from the sending device that was communicated using the power amplifier of the sending device when the communications do not comply with a predefined link quality

702
Receive two or more streams wireless at a display device from respective two or more computing devices

704
Automatically portion a display area of the display device such that content from the two or more streams is displayable concurrently by the display device

706
Portion so content from a first stream is viewable using a first pair of three dimensional viewing glasses but not a second pair of three dimensional viewing glasses and content from a second stream is viewable using the second pair of three dimensional viewing glasses but not the first pair of three dimensional viewing glasses

708
Reformat data by respective ones of the two or more computing devices according to respective portion via which the data is to be displayed by the display device

Fig. 7

WIRELESS COMMUNICATION TECHNIQUES

RELATED APPLICATIONS

This application claims priority under 35 U.S.C. §119(e) to U.S. Provisional Patent Application No. 61/430,639 filed Jan. 7, 2011 and U.S. Provisional Patent Application No. 61/431,312 filed Jan. 10, 2011, the entire disclosure of each of these applications is hereby incorporated by reference.

BACKGROUND

The prevalence of wireless communication is ever increasing. Originally, wireless communication techniques were employed by computing devices such as traditional desktop computers and laptops to communicate locally with each other as well as remotely via the Internet. Use of these techniques was then expanded to a wide variety of other devices, such as game consoles, input devices (e.g., keyboard and mouse), printers, and so on.

As this use expanded, however, traditional techniques that were employed to perform wireless communication were confronted with a wide range of difficulties. For example, the sheer prevalence of these techniques may cause interference between devices that employed the techniques thereby limiting the usefulness of the techniques to each of the devices that employ them. Further, the techniques may consume relatively large amounts of power to overcome this interference, which may limit usefulness of the techniques to mobile devices that are powered by a battery and cause further interference.

SUMMARY

Wireless communication techniques are described. In one or more implementations, techniques are described that involve active power control such that a device may bypass use of a power amplifier to communicate wirelessly. In one or more additional implementations, wireless communication techniques are described in which one or more streams on a receiving device are leveraged by a sending device, such as through use of a buffer. In one or more further implementations, a receiving device is configured to adjust a display based on wireless communications received from a plurality of devices.

Yet further, wireless communication techniques are described in which multiple bands may be leveraged to provide wireless communication. Yet further again, in one or more implementations wireless communication techniques are described in which a sending device may employ codec adaptation. Still yet further, in one or more implementations, wireless communication techniques are described which may be used to change characteristics of a channel used to communicate data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is a flow diagram depicting a procedure in an example implementation of wireless communication techniques that relate to control of a power amplifier to transmit data over different ranges.

FIG. 7 is a flow diagram depicting a procedure in an example implementation of wireless communication techniques that relate to wireless display techniques for content received from a plurality of devices.

DETAILED DESCRIPTION

Overview

Figure 1:
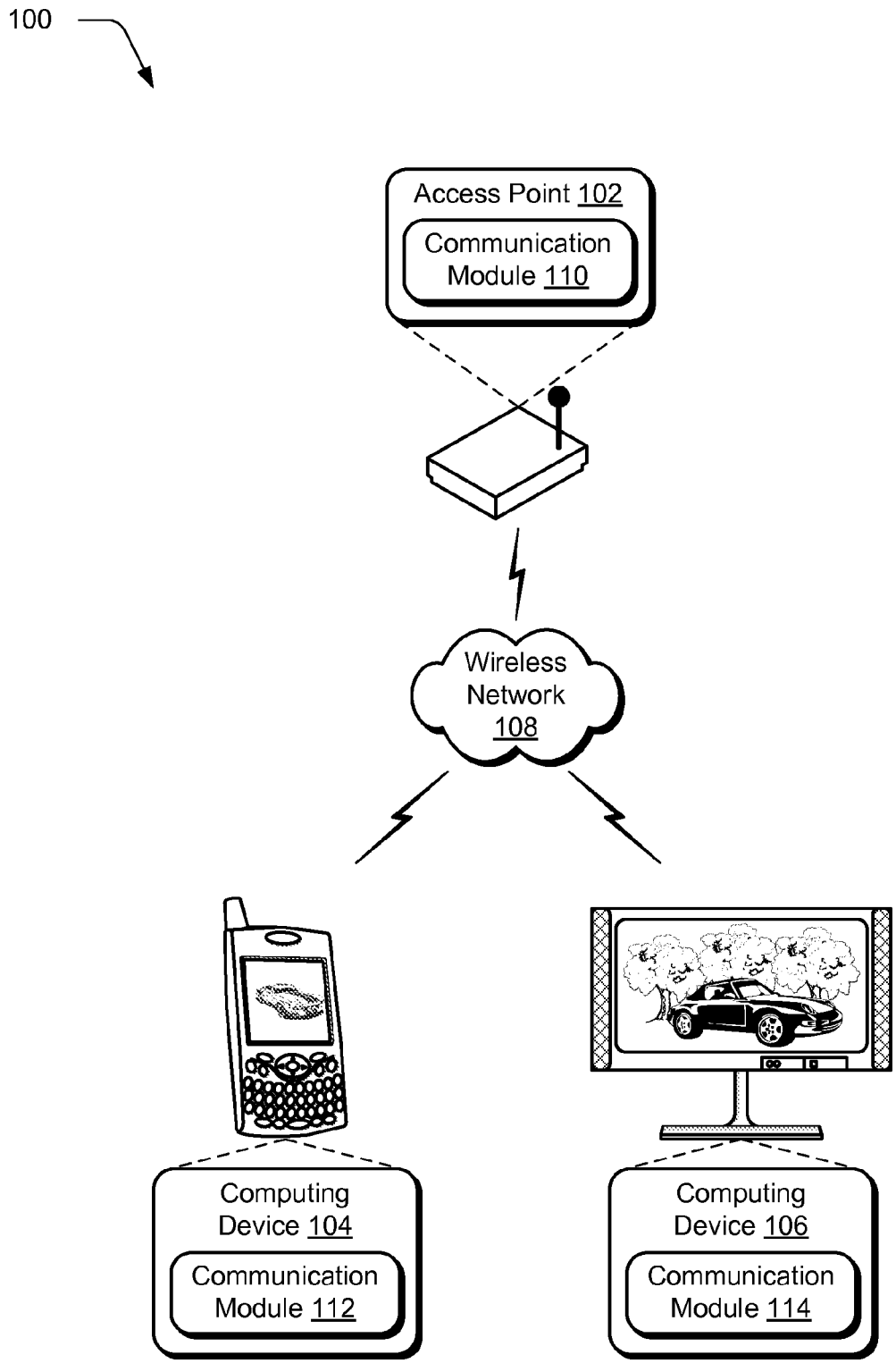
FIG. 1 is an illustration of an environment in an example implementation that is operable to employ short and medium range wireless communication techniques.

The prevalence of devices that employ wireless communication is ever increasing. Consequently, traditional techniques that were employed to provide wireless communication may be confronted with an ever increasing amount of interference between these devices, which may limit usefulness of the communication techniques.

Wireless communication techniques are described. In one or more implementations, techniques are described that involve active power control such that a device may bypass and disable the power amplifier to communicate wirelessly. The techniques may be employed by but are not limited to short and medium range direct and indirect communication, such as Bluetooth, Wi-Fi (e.g., IEEE 802.11), Wi-Max, and so on. In this way, power consumption by the device may be lessened in situations in which use of the power amplifier may be avoided, further discussion of which may be found in relation to FIGS. 2 and 3.

In one or more implementations, wireless communication techniques are described in which one or more frame buffers and/or streams on a receiving device are leveraged by a sending device. For example, the sending device may determine that a next frame matches a frame already sent to a receiving device and may then hibernate parts of the device that are used to transmit frames until a "new" frame is to be sent. In this way, power usage and network interference by the sending device may be decreased, further discussion of which may be found in relation to FIGS. 4 and 5.

In one or more implementations, a receiving device is configured to adjust a display based on wireless communications received from a plurality of devices. For example, the receiving device may be configured as a television. The television may receive wireless communications from a plurality of different devices, e.g., mobile phones. The television may then portion the display to display video from each of the devices. Further, the video sent by the devices may be configured according to how it is to be displayed by the display device, such as by adjusting a resolution and/or aspect ratio to match the portion in which the video is to be displayed. Further discussion of these techniques may be found in relation to FIGS. 6 and 7.

In one or more implementations, wireless communication techniques are described in which multiple bands may be leveraged to provide wireless communication. For example, a wireless device may have support for both 2.4 GHz and 5.0 GHz bands. The device may be configured to employ both bands to communicate with other devices, such as to employ the 2.4 GHz band to communicate control information and the 5.0 GHz band to communicate a data payload simultaneously, further discussion of which may be found in relation to FIGS. 8 and 9.

In one or more implementations, depending on the content type for the specific frame, the codec type may be changed to a type that is better suited for handling a current information type. This may be performed by leveraging multiple processing techniques such as frequency profile, frequency gradients, temporal changes, edge change detection and other video and image progressing algorithms. Additionally, this may be performed as part of a decision tree to select an appropriate compression (e.g., codec) for use by the video frame, further discussion of which may be found in relation to FIGS. 10 and 11.

In one or more implementations, wireless communication techniques are also described which may be used to change characteristics of a channel used to communicate data. For example, the sending device may detect noise and renegotiate with a receiving device for a new channel, thereby saving power due to the increased cleanliness of the new channel and less retransmission of data. Other techniques are also contemplated, such as to dynamically adjust a compression ratio, an amount of change, change from one codec to another, beam forming, FEC (Forward Error Correction) and so on, further discussion of which may be found in relation to FIGS. 10 and 11.

In one or more implementations, wireless communication techniques are described in which a sending device employs codec adaptation. For example, a sending device may determine whether a receiving device supports video in a current format. If so, the sending device may communicate the video without decoding it. If not, the sending device may transcode the video. In this way, the sending device may conserve resources that would otherwise be used to unnecessarily decode the video, further discussion of which may be found in relation to FIGS. 10 and 11.

In the following discussion, example environments are described that may be employed to perform the techniques described herein. Example procedures are also described, which may be performed in the example environments and elsewhere. Accordingly, the example environments are not limited to performance of the example procedures and the example procedures are not limited to being performed in the example environments.

Example Wireless Environment

FIG. 1 is an illustration of an environment 100 in an example implementation that is operable to employ the wireless communication techniques described herein. The illustrated environment 100 includes an access point 102, a computing device 104, and another computing device 106 that are communicatively coupled via a wireless network 108.

The computing devices 104, 106 may be configured in a variety of ways. For example, the computing devices 104, 106 may be configured as computers that are capable of communicating over a wireless network 108, such as a desktop computer, a mobile station, an entertainment appliance, a tablet, a set-top box communicatively coupled to a display device, a wireless phone, a game console, a digital television, and so forth. Thus, the computing devices 104, 106 may range from full resource devices with substantial memory and processor resources (e.g., personal computers, game consoles) to a low-resource device with limited memory and/or processing resources (e.g., traditional set-top boxes, hand-held game consoles, "dumb" digital televisions having limited functionality).

The computing devices 104, 106 may also include an entity (e.g., software) that causes hardware of the computing devices 104, 106 to perform operations, e.g., processors, functional blocks, and so on. For example, the computing devices 104, 106 may include a computer-readable medium that may be configured to maintain instructions that cause the respective computing device, and more particularly hardware of the computing devices 104, 106 to perform operations. Thus, the instructions function to configure the hardware to perform the operations and in this way result in transformation of the hardware to perform functions. The instructions may be provided by the computer-readable medium to the computing devices 104, 106 through a variety of different configurations.

One such configuration of a computer-readable medium is signal bearing medium and thus is configured to transmit the instructions (e.g., as a carrier wave) to the hardware of the computing device, such as via the network 108. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although a single wireless network 108 is illustrated, the network may assume a wide variety of configurations and may be configured to include multiple networks, e.g., to support direct and/or indirect communication, follow different standards, and so on. The wireless network 108, for instance, may be configured for short range communication, e.g., communication typically employed with a distance of 10 meters. For example, the short range communications may be configured to support direct and/or indirect communication within a room or between adjacent rooms of a structure such as a typical user's house.

The wireless network 108 may also be configured for medium range communication such as in accordance with Wi-Fi (e.g., IEEE 802.11) for distances of up to approximately 300 meters, WiMAX (e.g., IEEE 802.16) for distances of up to approximately 1 km, and so on. These standards allow a variety of different computing devices (e.g., laptops, phones, games machines, and consumer electronics devices) to connect to the access point 102 and/or directly with each other to allow mobile communication of a variety of content, such as web content, media content, email, messaging, and a variety of other data types. For example, a majority of mid to high end mobile communication devices may leverage Wi-Fi to enable rich browsing, increased functionality for applications, and data oriented communications. Thus, in each of these examples of short and medium range communication the wireless network 108 is not a wireless telephone (e.g., cellular) network that is typically used for telephone communication, although such implementations are also contemplated.

The access point 102 and the computing devices 104, 106 are each illustrated as including a respective communication module 110, 112, 114. The communication modules 110, 112, 114 are representative of functionality of the respective device to communicate over the wireless network 108. For example, the communication modules 110, 112, 114 may represent functionality that may be used to encode data for transmission as well as decode data received by the device in accordance with one or more of the standards described above. The functionality may also involve techniques that may be used to manage communication, such as to negotiate channels, resolve collisions, and so on.

As previously described, the variety of devices that employ wireless communication techniques is ever increasing, such as laptops, digital television, smart phone platforms, optical disc players, and so on. Some of these devices may also employ a set of standards (e.g., from the Digital Living Network Alliance) to allow device discovery and connection, media file browsing, and exchange of digital media such as photos, music, and videos.

Accordingly, a variety of different techniques maybe used to communicate via the wireless network 108. For example, communication may be performed using the access point 102 such that the computing device 104 transmits data through the access point 102 for receipt by the computing device 106. Direct communication between the computing devices 104, 106 may also be supported that does not involve use of the access point 102 or other device as an intermediary.

For instance, direct communication (e.g., Wi-Fi direct) may be leveraged to avoid costly dual path connections (e.g., up to access point 102 and down from access point 102) of devices where principally point-to-point connections may be employed, e.g., when the computing devices 104, 106 are within range of each other. This allows data types (e.g., video) to be sent directly from a sending device (e.g., the computing device 104 illustrated as a smart phone) directly to a receiving device, e.g., to the computing device 106 illustrated as a digital television. Thus, the wireless network 108 may also represent communication that does not involve the access point 102. In an implementation, the computing device 104 may also communicate with the access point 102 for web based content, but the data from phone to digital television is not transferred to the access point 102.

Additional standards may be employed in the environment 100 which relate to Wi-Fi display. For example, uncompressed standards (e.g., Wi-Gig) or compressed standards (e.g., 802.11n) may be followed to transmit display information such as video that may be displayed by a display device, such as the illustrated digital television. Wi-Fi display opens up a number of opportunities beyond traditional media types to web pages, games, messaging, and so on. It may also be used to allow the source device (e.g., the computing device 104) to control the target display (e.g., computing device 106) thereby allowing a predictable and consistent user experience. For instance, the source device (potentially also multiple devices) may be used to drive each of the pixels on the target device, a portion of the pixels allotted to the source device, and so on as further described in the following discussion.

In the following sections, a number of power consumption and overall wireless network quality improvement techniques are discussed. Examples of such techniques include "backing off" transmit power to a minimum level that is usable to successfully drive a wireless display device, avoiding use of a common frequency for wireless display and access point transactions, dynamically changing codec type and/or parameters, as well as techniques usable to avoid transmission of redundant data between the devices. Further discussion of these and other techniques may be found in relation to the following sections.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors, functional blocks, and/or application specific integrated circuits.

Power Amplifier Techniques

Figure 2:
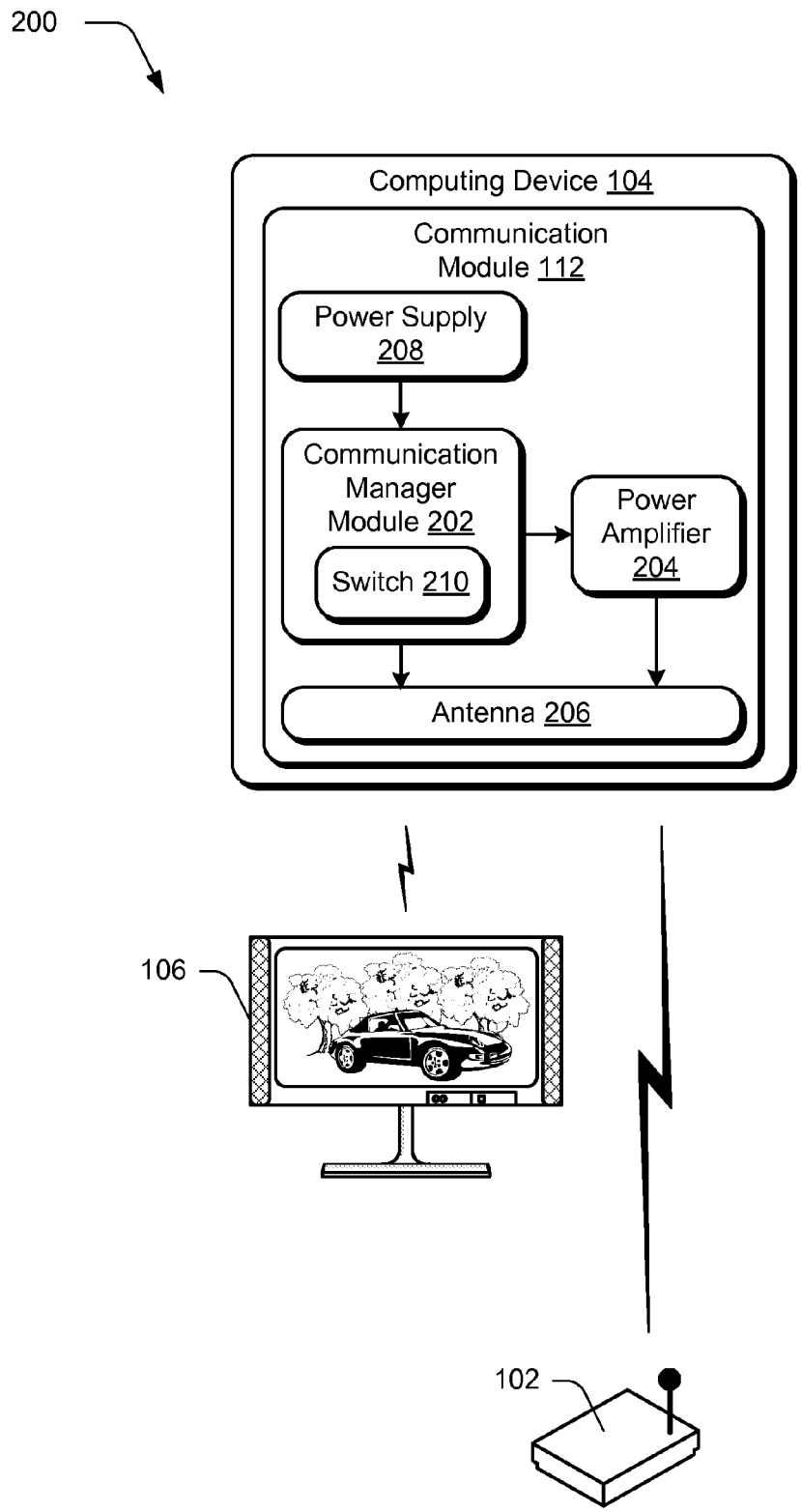
FIG. 2 depicts a system in an example implementation in which a computing device of FIG. 1 is configured to bypass and disable a power amplifier for short range wireless communication.

FIG. 2 depicts a system 200 in an example implementation in which a computing device 104 of FIG. 1 is configured to bypass and disable a power amplifier for wireless communication. The communication module 112 of the computing device 104 is illustrated as including a communication manager module 202, a power amplifier 204, an antenna 206, a power supply 208, and a switch 210.

In the illustrated example, Wi-Fi communications between the computing device 104 and the access point 102 may occur over a significant range as the access point 102 may be frequently located in a different room, different floor in a house, and so on. Consequently, in order to drive high bandwidth communications in such a situation, the output power from the accessing device may be relatively high. However, other situations may also be encountered, such as when the communicating devices (e.g., the computing device 104 and another computing device 106) are located, in comparison, at a relatively close range to each other as illustrated. For example, in wireless display scenarios that involve both direct communication between the devices and a relatively short distance (e.g., under five meters), significantly lower power may be used while still operating at high bandwidths, e.g., at high Quadrature Amplitude Modulation (QAM) configurations, as would otherwise be the case when operating across a relatively longer distance. Therefore reducing the RF footprint of a particular wireless communication system which will permit greater frequency and/or channel reuse densities.

Accordingly, in this example the communication module 112 may adapt to changes in range by measuring wireless link quality and adjusting power output control on a regular basis, such as a packet-by-packet basis, at predefined intervals, and so on. For example, the communication module 112 may use pilot data sent during Wi-Fi handshake per packet data transfer, RSSI signal strength information, use packet error conditions to adjust rates, and so on. In one or more implementations, output power may decrease values up to ten db and beyond using one or more of these data items and assuming a relatively close range (e.g., small distance) to the destination device, e.g., less than five meters.

In addition to power control, power consumption may be further reduced by bypassing the power amplifier 204, which although represented as internal to the device may also be configured as an external amplifier and thus the switch 210 may be internally or externally deployed. For example, in some situations the power amplifier 204 employed by the computing device 104 may consume high static power even with low output power demands, such as when class AB amplifiers are used. Accordingly, the communication manager module 202 may employ a switch 210 to allow the power amplifier 204 to be used for scenarios involving a relatively significant range, e.g., access point 102 scenarios that may involve a significant distance. The communication manager module 202 may directly drive the antenna 206 for Wi-Fi Direct circumstances (e.g., with the computing device 106 located at a relatively close distance) and bypass the power amplifier 204 using the switch 210 to save power, which may be particularly useful in mobile applications but may also be useful in other applications. For example, for power amplifiers that consume a base-load current these techniques may avoid significant power consumption even at low power levels, such as by employing the switch 210 that may disable the power amplifier from the power supply 208, e.g., by "turning off" a supply rail to the power amplifier 204. Thus, the RF transmit power may be reduced to a minimal power level that is sufficient to support a desired link quality, which therefore reduces the RF footprint of the communication system.

Further, the use of relatively lower power may also result in a reduction in noise in a wireless network 108, thereby further saving power both for the device as well as other devices. For instance, disruption to other devices within the range of other devices that engage in wireless communication may be reduced by having each device reduce the amount of output power used, e.g., in office and other high density environments. Thus, if in an office environment, a number of devices within the 2.4 GHz/5 GHz unlicensed band range may share a single frequency if the reduced RF power footprint is small enough to create a low-noise floor for the other devices. For example, wireless display functions may create significant band noise due to bandwidth utilization and thus decreasing the amount of power will reduce the radio frequency (RF) footprint and further minimize the disruption to devices on the same frequency. The smaller the RF footprint and the more efficient the non-overlapping channel reuse is implemented the greater the density of wireless devices on the same frequencies can be realized.

FIG. 3 depicts a procedure 300 in an example implementation of wireless communication techniques that relate to control of a power amplifier to transmit data. The following discussion describes techniques that may be implemented utilizing the previously described systems and devices. Aspects of each of the procedures may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

A sending device detects whether communications between a receiving device and the sending device comply with a predefined link quality (block 302). The detecting, for instance, may be based at least in part on an error rate or a scan of one or more wireless channels during one or more non-transmit cycles. Further, the detecting may be performed on a per packet basis, at predefined intervals (e.g., based on number of packets transmitted, passage of predefined amounts of time), and so on.

Responsive to a determination that the communication comply with the predefined link quality, a power amplifier of the sending device is bypassed to transmit a wireless communication to be received by the sending device (block 304). The determination, for instance, may be based on the detection above. If it is determined that the receiving device is within range based on the predefined link quality, the communication manager module 202 may bypass the power amplifier 204 using a switch 210 or other techniques and disable the power amplifier such that a supply rail to the power amplifier 204 from the power supply 208 (e.g., a battery, "plug in" source, and so on) is disabled. The communication manager module 202 may then communicate directly with the antenna 206 to transmit the wireless communication (e.g., one or more packets) without the aid of the power amplifier 204. In this way, the sending device may reduce the amount of power used to perform the wireless communication, reduce an amount of interference caused by the wireless communication with other wireless devices that would otherwise be within range of the interference, and so on.

However, responsive to a determination that communication do not comply with the predefined link quality, a power amplifier of the sending device is used to transmit a wireless communication to be received by the sending device (block 306). Thus in this instance, the sending device may use the additional operational range afforded through use of the power amplifier 204, such as to comply with operational ranges of IEEE standards.

Accordingly, a wireless communication may be received by a receiving device from the sending device that was communicated without using the power amplifier of the sending device when the communication comply with the predefined link quality (block 308). Thus, power used by the sending device may be conserved and reduce interference caused by the communication. Additionally, a wireless communication may be received by a receiving device from the sending device that was communicated using the power amplifier of the sending device when the communications do not comply with the predefined link quality (block 310). In this way, the operational range of the computing device may be extended in instances in which the devices are not within the predefined range.

Wireless Buffering and Streaming Techniques

Figure 4:
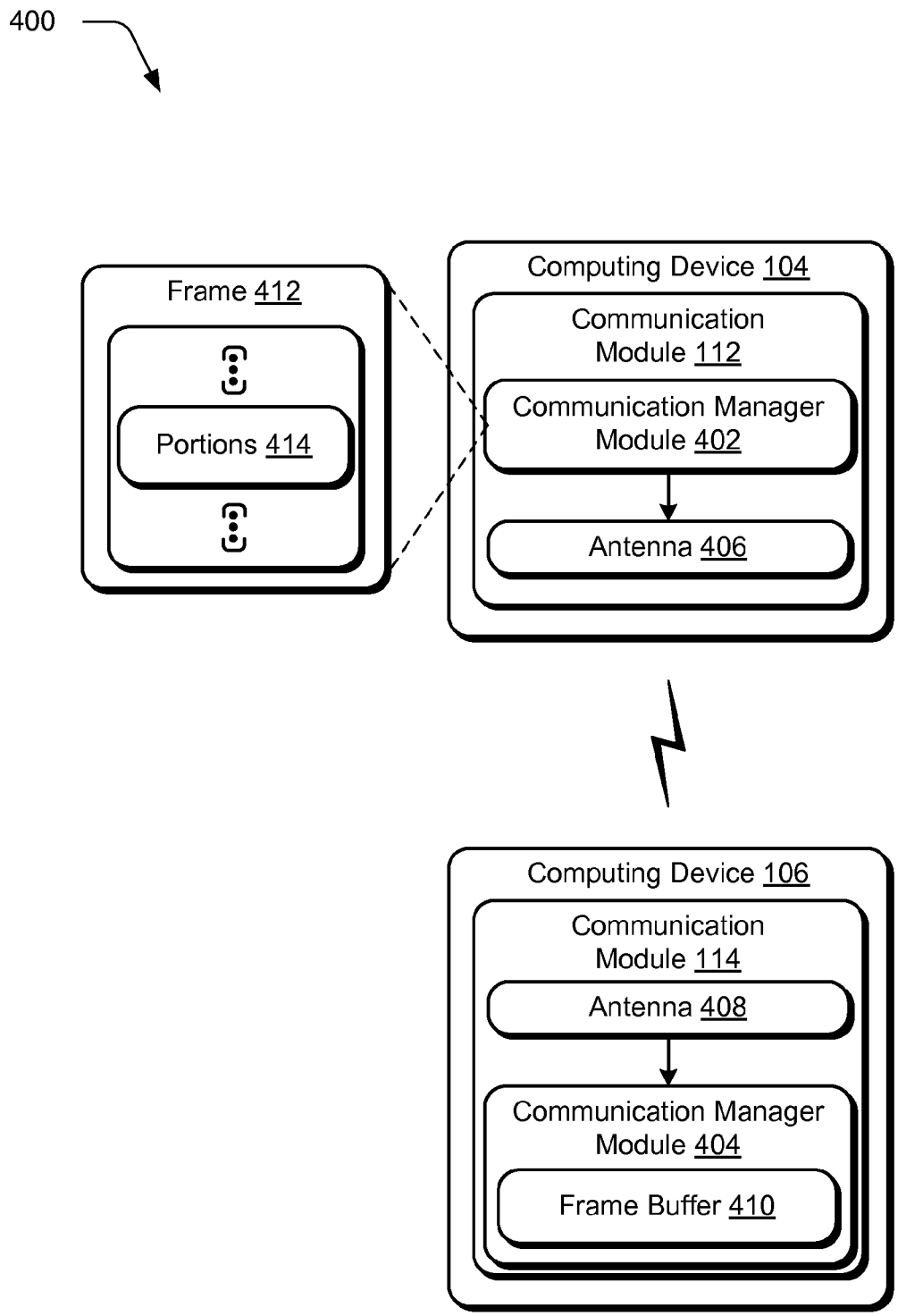
FIG. 4 depicts a system in an example implementation in which existence of a buffer and/or use of a data stream on a receiving device is leveraged by a sending device.

FIG. 4 depicts a system 400 in an example implementation in which existence of a buffer on a receiving device is leveraged by a sending device. In this illustrated example, a computing device 104 sends data (e.g., streams the data) via a wireless connection to the other computing device 106. The communication modules 112, 114 of the respective computing devices 104, 106 are shown in greater detail as including a respective communication manager modules 402, 404 and antennas 406, 408. The communication manager module 404 is further illustrated as including a frame buffer 410, which may be used to cache frames to be rendered by the computing device 106.

Figure 6:
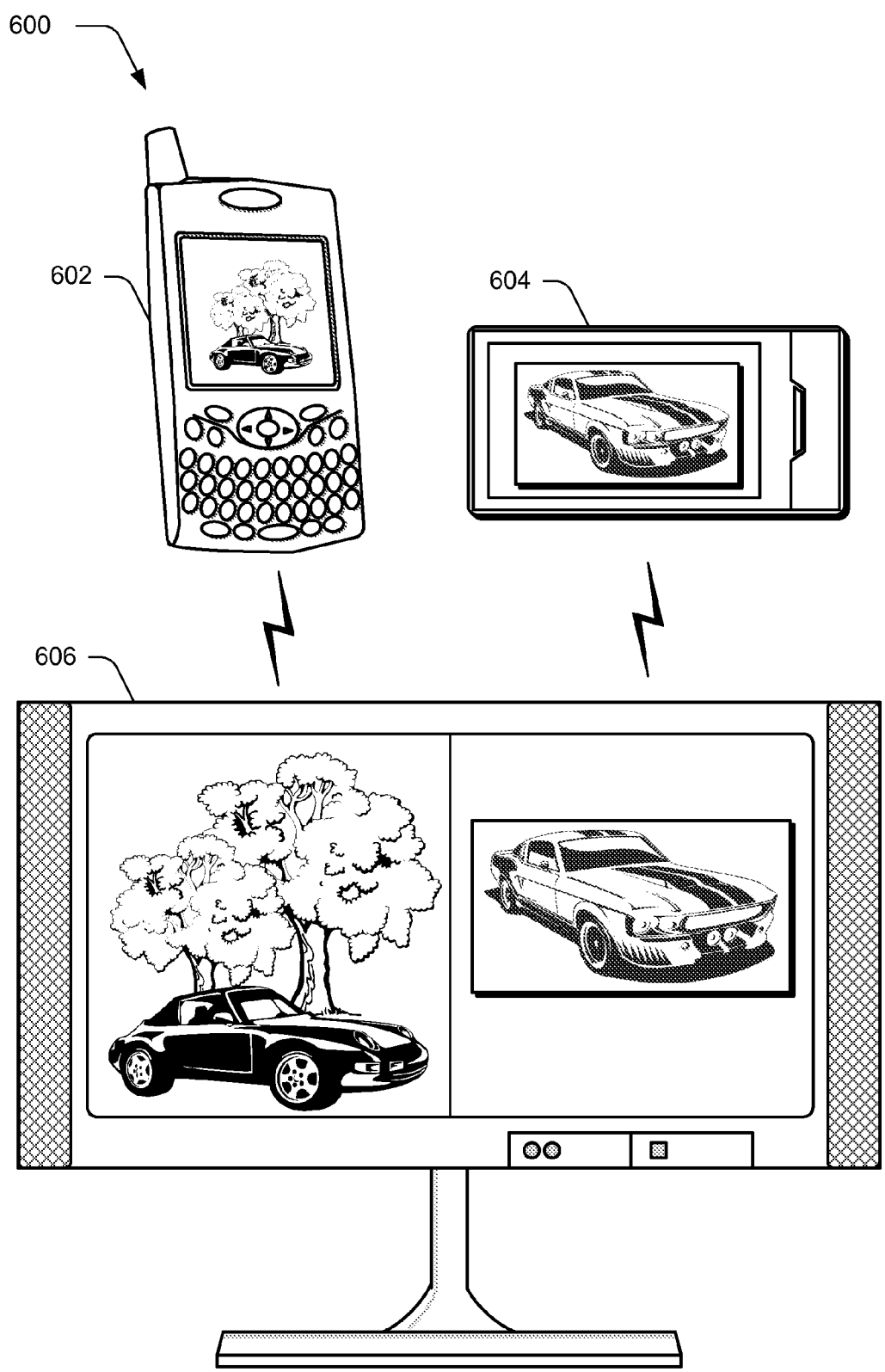
FIG. 6 depicts a system in an example implementation in which display techniques are employed in a wireless environment.

Depending on the configuration there may be two or more frame buffers and/or streams, which may be used to support a number of wireless sources as shown in FIG. 6. For example, at the wireless display there may be a buffer and/or streams associated with each of the wireless A/V sources being received by the display. Thus, the frame buffer 410 may be representative of a plurality of different frame buffers that may be utilized for a plurality of different streams. This data may then be processed (e.g., scaled) and merged into a master frame buffer and/or streams that the display uses to generate a final image on the display. There are a variety of other techniques that may be used to handle management of the multiple wireless video sources onto a single screen as further described in relation to FIG. 6.

A variety of traditional wireless display solutions involve power consumption above desirable targets for mobile applications, i.e., for computing devices that rely on a battery for power. Fortunately, many scenarios include significant time periods when updates to the wireless display are unnecessary, e.g., for web browsing, instant messaging (IM), music, presentations that do not involve active animations, and so on. Traditional solutions, however, continue to transmit frames 412 with identical content, thereby wasting power of both the sending and receiving device as well as resulting in introducing additional and needless noise to the environment that could be avoided.

In this example, additional control signaling by the communication manager module 402 of the sending computing device 104 and a frame buffer 410 of the receiving computing device 106 are leveraged such that frames which have new content are transmitted from the source device but redundant frames are not, e.g., frames that have matching content.

In this case, the additional control signals contain control data to cause the wireless display to repeat a particular frame until a new frame is provided. The source transmission portion of module 112 may then enter a sleep mode until a new frame is to be sent to the wireless display. Responsive to this, the internal frame buffer 410 may be used to drive the target display until a new frame is sent. Beyond this, frame rates may be reduced from traditional (60 Hz/50 Hz) rates with lower frame rates being sent to the target display with associated control signals.

For example, a presentation may involve a relatively static display, e.g., a slide that does not change until an input is received. Accordingly, the system may send the frame but then determine that the information has not changed and therefore send a "repeat" command to the wireless display. The wireless display may then display this frame (e.g., over and over) until the source device sends a new frame. During this period there may be little to no wireless video information sent and therefore the power consumed by the source device and noise that otherwise may occur in the environment from transmitting the video information is reduced.

Additionally, control signals may also be used to send the portions 414 of the frame 412 that is being updated. This may work for a variety of different content, such as web pages with active portions (e.g., an ad) where the majority of the frame 412 is not active. Further, extender concepts may also be leveraged where video and audio streams are sent independent to UI streams. Thus, when the overlaying UI frame is quiet, the video updates for the subsection of the display where video is presented are sent. In additional embodiments, control data may also be used for animations and object manipulation.

Figure 5:
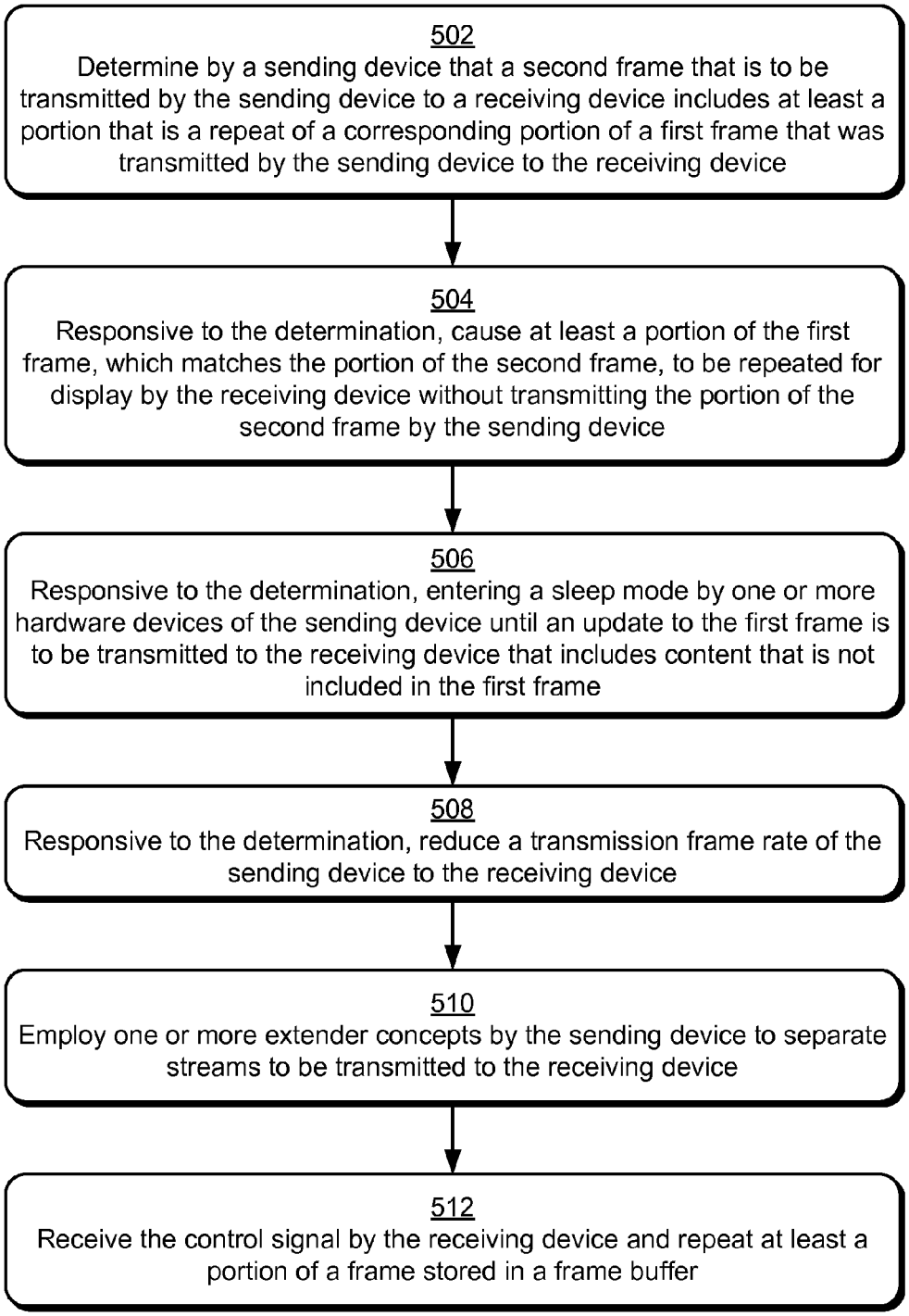
FIG. 5 is a flow diagram depicting a procedure in an example implementation of wireless communication techniques that relate to wireless buffering and stream usage techniques.

FIG. 5 depicts a procedure 500 in an example implementation of wireless communication techniques that relate to wireless buffering and streams. The following discussion describes techniques that may be implemented utilizing the previously described systems and devices. Aspects of each of the procedures may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 400 of FIG. 4.

A determination is made by a sending device that a second frame that is to be transmitted by the sending device to a receiving device includes at least a portion that is a repeat of a corresponding portion of a first frame that was transmitted by the sending device to the receiving device (block 502). A communication manager module 402, for instance, may determine that a frame is repeated that is to be wirelessly transmitted from the computing device 104 to another computing device 106. The frame, for instance, may be part of a presentation or other content that includes a relatively static display of content.

Responsive to the determination, at least a portion of the first frame, which matches the portion of the second frame, is caused to be repeated for display by the receiving device without transmitted the portion of the second frame by the sending device (block 504). Continuing with the previous example, the communication manager module 402 may form a control signal to cause the communication manager module 404 of the computing device 106 to repeat at least a portion of a frame stored in a frame buffer 410. In an implementation, the portion may encompass a substantial display area of the frame. In another example, the sending device does not send a control signal or a frame to the receiving device. The receiving device may then detect this lack of data (e.g., frame and/or control signal) and therefore repeat a frame that has already been received by the receiving device. In this way, the receiving device may act without receipt of data from the sending device to repeat a frame.

Also responsive to the determination, a sleep mode may be entered by one or more hardware devices or subsystem of the sending device until an update to the first frame is to be transmitted to the receiving device that includes content that is not included in the first frame (block 506). The communication manager module 402, for instance, may cause hardware one or more components of the computing device 104 that are involved in wireless transmission to enter a sleep mode to reduce power consumption by the computing device 104. This may include reducing power supplied to the hardware components but still keeping a baseline level of power available such that the components may be quickly awakened. This may also include turning off a supply rail to the one or more components to reduce power consumption completely or near completely. A variety of other examples are also contemplated.

Further responsive to the determination, a transmission frame rate of the sending device to the receiving device may be reduced (block 508). The communication manager module 402, for instance, may determine that a static display is to continue. Accordingly, the communication manager module 402 may reduce the frame rate thereby conserving power and reducing interference in the wireless environment with other devices that engage in wireless communication.

One or more extender concepts may also be employed by the sending device to separate streams to be transmitted to the receiving device (block 510). The extender concepts, for instance, may be configured to cause video, audio and/or user interface streams to be transmitted separately. In this way, updates to each of these streams may be communicated without involving the other streams.

Accordingly, the receiving device may receive one or more control signals and then repeat at least a portion of a frame stored in a frame buffer (block 512) as well as employ other of the previous described techniques for wireless communication described in the above blocks. Although examples of buffering and streaming techniques were described, a variety of other techniques may also be employed without departing from the spirit and scope thereof, examples of which may be found in the following section.

Wireless Display Techniques

FIG. 6 depicts a system in an example implementation in which wireless display techniques are shown. In this example, two mobile computing devices 602, 604 are in wireless communication with another computing device, illustrated as a display device 606. As stated in relation to FIG. 1, however, the computing devices may assume a wide variety of other configurations.

The display device 606 as illustrated receives wireless data from the mobile computing devices 602, 604. In response, the display device 606 portions an available display area, which in this instance is to divide the display area down the middle although other examples are also contemplated, such as to employ picture-in-picture techniques having portions of various sizes that may be adjustable by a user of the display device 606.

For example, for a three-dimensional display an entire display area of the display device may be used but configured to display particular content to particular users by leveraging glasses (e.g., LCD shutter glasses) typically worn by such users. Through synchronization between the wireless display and the glasses, each user may view different content and this display may appear simultaneous to the users.

Further, the sending devices may be configured to take advantage of this portioning. For example, the mobile communication devices 602, 604 may be configured to reformat the data being sent to the display device 706 to have an aspect ratio, resolution, and so on that is configured to approximate and even match the portions. In this way, the devices may send a lesser amount of data than would otherwise be sent if the full display area was consumed by the data, e.g., video. A wide variety of other implementations are also contemplated without departing from the spirit and scope thereof.

FIG. 7 depicts a procedure 700 in an example implementation of wireless communication techniques that relate to display of content from a plurality of devices. The following discussion describes techniques that may be implemented utilizing the previously described systems and devices. Aspects of each of the procedures may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 600 of FIG. 6.

Two or more streams are received wirelessly at a display device from respective two or more computing devices (block 702). As shown in FIG. 6, for instance, the wireless display device 606 may receive streams of content from first and second mobile computing devices 602, 604.

The display device may then automatically portion a display area of the display device such that content from the two or more streams is displayable concurrently by the display device (block 704). Continuing with the previous example, the display device 606 portions a display area into halves as illustrated such that content is displayable concurrently from the plurality of mobile computing devices 602, 604. Further, picture-in-picture techniques may be employed such that a user may change a size of the portions, reposition the portions, and so on. A variety of other portioning techniques are also contemplated.

For example, the display area may be portioned so that a first stream is viewable using a first pair of three dimensional viewing glasses but not a second pair of three dimensional viewing glasses and content from a second stream is viewable using the second pair of three dimensional viewing glasses but not the first pair of three dimensional viewing glasses (block 706). In this example, the display device 606 may be configured for three-dimensional display through communication with the three dimensional viewing glasses, e.g., LCD shutter glasses. In this example, larger portions may be displayed (e.g., overlapping even to the point of consuming an approximate entirety of the display area) and appear concurrent to two or more users, even though the users may view different content from different streams.

The data may also be reformatted by respective ones of the two or more computing devices according to respective portions via which the data is to be displayed by the display device (block 708). The display device 606, for instance, may communicate with the mobile computing devices 602, 604 to provide details regarding an available resolution, aspect ratio, and so on of a portion that is to be used to display content from the device. The mobile computing devices 602, 604 may then format the content accordingly such that this reformatting may be "offloaded" from the display device 606. Other implementations are also contemplated, such as reformatting that is performed by the display device, use of predefined portions such that the reformatting may be performed automatically and without user intervention by the mobile computing devices, and so forth.

Dual Band Communication

Figure 8:
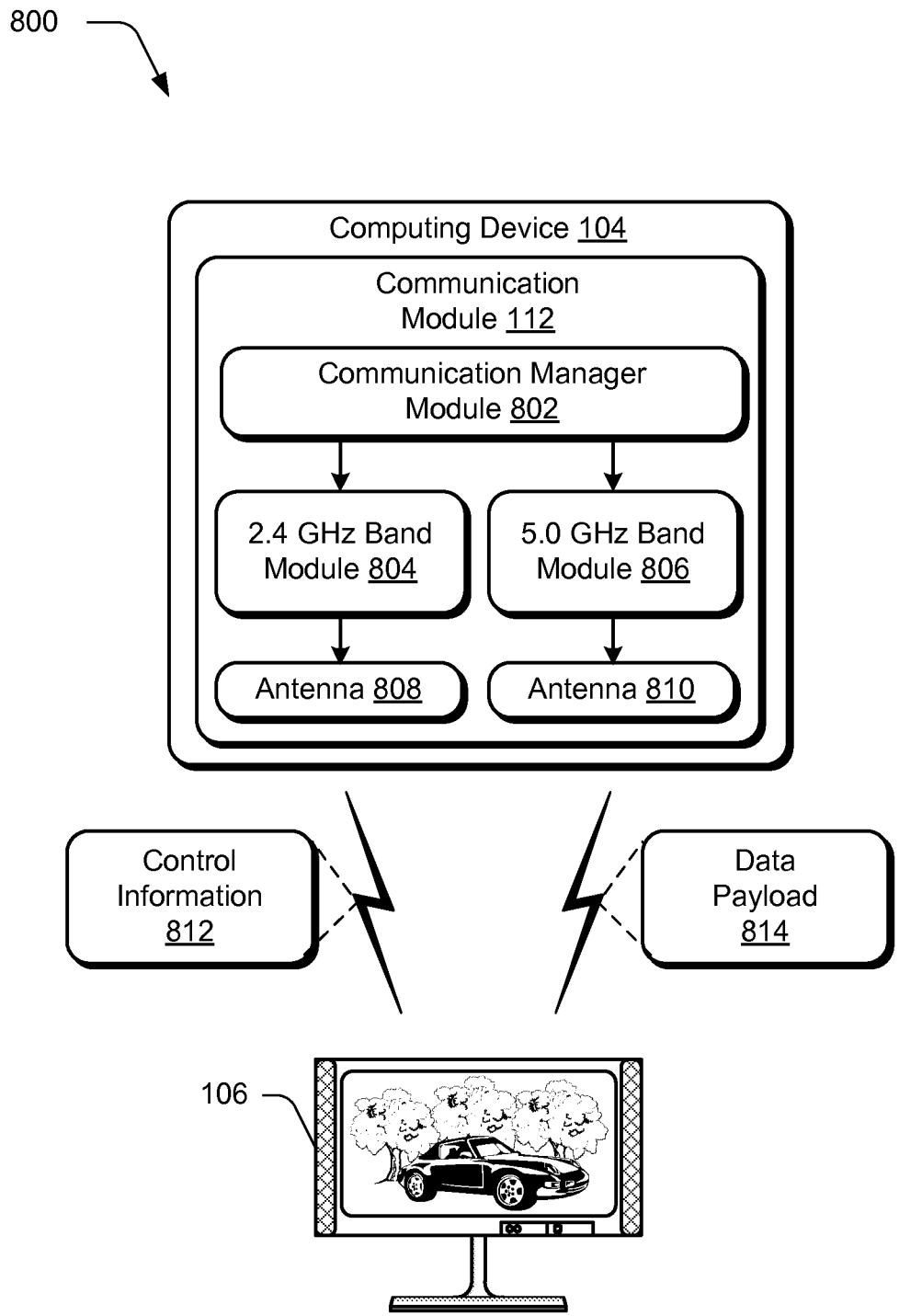
FIG. 8 illustrates an example system in which dual band functionality of a wireless device is leveraged to provide wireless communication that employs both bands.

FIG. 8 illustrates an example system 800 in which functionality of a wireless device that involves a plurality of bands is leveraged to provide wireless communication that employs two or more of the bands. In this illustrated system 800, the communication module 112 is shown in greater detail as employing a communication manager module 802, a 2.4 GHz band module 804, a 5.0 GHz band module 806, and respective antennas 808, 810. Other implementations are also contemplated, such as use of a dual-band antenna.

Techniques are described in the following that may be used to leverage independent hardware that is available on many conventional devices to support a plurality of bands (e.g., both 5 GHz and 2.4 GHz bands) simultaneously, and without significant reconfiguration of the hardware. Traditionally, this radio frequency (not baseband) hardware of the separate bands is not shared between the bands, although in some cases, a common phase-locked loop (PLL) is used but may be replicated by a vendor. Accordingly, in one or more implementations wireless communication techniques may be employed to leverage two or more bands, such as to communicate control information 812 over the 2.4 GHz band and a data payload 814 over the 5.0 GHz band.

In another example, a wireless channel within a band (e.g., 2.4 or 5.0 GHz) may be used for audio/visual and associated control information while another wireless channel within the band may be used for general wireless networking traffic.

Adjacent channels, e.g., non overlapping channels, may also be used where one is used primarily for access point internet data and the second is used for wireless display. For example, this may be performed in both 5 GHz and 2.4 GHz bands simultaneously to further increase bandwidth.

Techniques are also contemplated that use beacon signals to avoid loss of data sent to the device during Wi-Fi display operations. For example, the beacon may be checked for return data and used to interleave the transmission for wireless display.

Further, as wireless display is transmission oriented for the most part, special packet ACK techniques may be leveraged on the receiving side (e.g., the wireless display) to reduce "listening" on the wireless display channel.

In an implementation, many of the baseband portions of the system may be designed to handle larger bandwidth (e.g., more than 20 MHz) with dual (e.g., 40 MHz) to multi-channel (802.11ac—80 MHz and beyond) solutions. Accordingly, this hardware may be multiplexed from its present dual+ channel single orthogonal frequency division multiplexing (OFDM) stream to also handle dual independent OFDM streams, even if these occur at very different frequencies since associated baseband data can be the same. In other words, the Fast Fourier Transform (FFT) engines, Viterbi, and bit processing engines of the communication module 112 may process frames over two independent streams (e.g., access point 102 internet based traffic and Wireless Display). Typically, antennas for 2.4 GHz and 5 GHz are also different enough that separate antennas are used even if packaged in one component as illustrated.

In addition implementations systems may employ aspects of this functionality that do or do not support concurrent 2.4 and 5 GHz operation. For example, time-division multiplexing may be performed between bands. In another example, two channels in either 2.4 or 5 GHz band may be used. In an example implementation of the second example, two independent 20 MHz streams may be used. Again, one may run at high power to communicate with an access point 102, but the second may use low power to simply reach a relatively close computing device (e.g., a device within a predefined range such that a power amplifier is not used) as described in relation to FIGS. 2 and 3.

Figure 9:
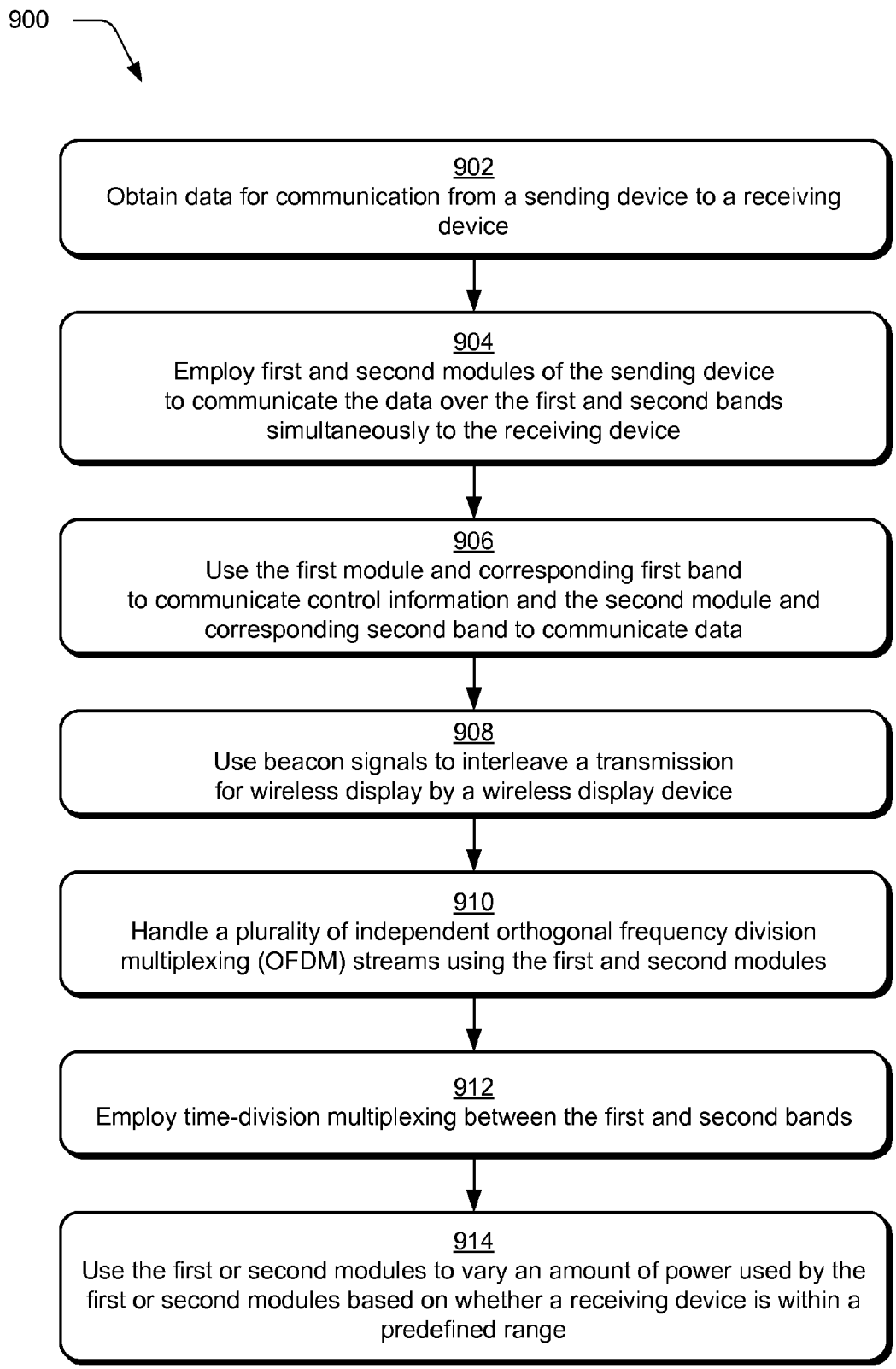
FIG. 9 is a flow diagram depicting a procedure in an example implementation of wireless communication techniques that relate to communication functionality that leverage a plurality of bands.

FIG. 9 depicts a procedure 900 in an example implementation of wireless communication techniques that relate to wireless communication that leverages a plurality of bands. The following discussion describes techniques that may be implemented utilizing the previously described systems and devices. Aspects of each of the procedures may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 800 of FIG. 8.

Data is obtained for communication from a sending device to a receiving device (block 902). The data, for instance, may be obtained through execution of one or more applications, received from another device, located in local or remote storage, and so on. Thus, the data may originate from a variety of different sources.

First and second modules of the sending device are employed to communicate the data over the first and second bands simultaneously to the receiving device (block 904), such as over 2.4 and 5.0 GHz bands. For example, each of the bands may utilize one or more channels to communicate with a same device, different devices, and so on.

The communication manager module 802 may also use a variety of other techniques to perform this communication. For example, the communication manager module 802 may use the first module and corresponding first band to communicate control information and the second module and corresponding second band to communicate data (block 906). In another example, the communication manager module 802 may use beacon signals to interleave a transmission for wireless display by a wireless display device (block 908) as previously described. Further, the communication manager module may handle a plurality of independent orthogonal frequency division multiplexing (OFDM) streams using the first and second modules (block 910). For instance, the Fast Fourier Transform (FFT) engines, Viterbi, and bit processing engines of the communication module 112 may process frames over two independent streams (e.g., access point 102 internet based traffic and Wireless Display).

The communication manager module 802 may also employ time-division multiplexing between the first and second bands (block 914). This time-division multiplexing may be performed by channels within a band, by the different bands, and so on. Further, the communication manager module 802 may also employ techniques that were described in relation to other sections. For instance, the communication manager module may use the first or second modules to vary an amount of power used by the first or second modules based on whether a receiving device is within a predefined range (block 914). A variety of other examples are also contemplated without departing from the spirit and scope thereof.

Wireless Decoding Techniques

Figure 10:
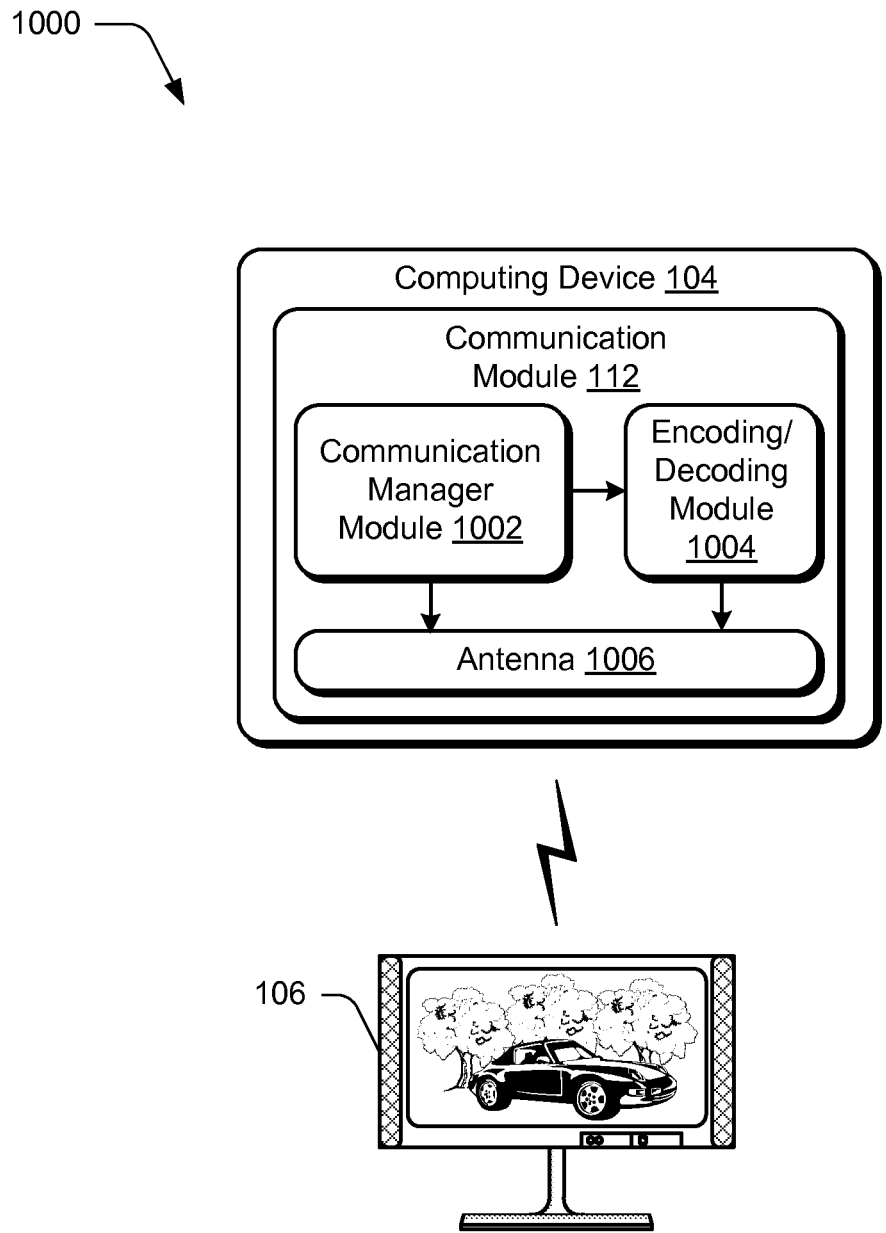
FIG. 10 depicts a system in an example implementation in which wireless encoding and decoding techniques are employed.

FIG. 10 depicts a system 1000 in an example implementation in which wireless decoding techniques are employed. The computing device 104 and another computing device 106 are illustrated as engaged in wireless communication. The communication module 112 of the computing device 104 is illustrated in greater detail as employing a communication manager module 1002, a decoding module 1004, and an antenna 1006.

In this example, the communication module 112 is configured to determine whether the receiving device (e.g., the computing device 106) is capable of decoding a source content format. If so, encoded data may be communicated by the communication module 112 without being decoded by the decoding module 1004. This also allows the target display to further improve image quality if appropriate.

In scenarios where the type of displayed items may be identified, the communication manager module 1002 may employ different codecs and/or codec rates to reduce the amount of traffic on the wireless communication link. Because the wireless communication may be performed via a packetized network (e.g., 802.11 standards), a reduction in traffic may also have a power and noise floor advantage. For gaming, for instance, use of a H.264 encoder may be appropriate. For UI and solutions that support object-like manipulation, wireless traffic may drop dramatically by sending objects and animation control versus sending data for each frame. For scenarios like Internet browsing, motion JPEG may be an alternative to preserve quality and data traffic. This may be performed by leveraging multiple processing techniques such as frequency profile, frequency gradients, temporal changes, edge change detection and other video and image progressing algorithms as part of a decision tree to select an appropriate codec (e.g., compression algorithm) for use in encoding the video frame.

Further, to minimize transmit RF power, different audio/visual (A/V) compression solutions for given types of media content may be used by the communication manager module 1002. For example, compression type and ratios may be adjusted on a per frame or sub frame basis to minimize the radio frequency (RF) power used to maintain a reliable RF link.

In an implementation, the devices (e.g., computing devices 104, 106) perform a scan to locate a possible 20 MHz in the target frequency band that is as "free" as possible in comparison with other bands before starting the link. This further allows spatial diversity of multiple wireless display users. This scan may also be done if high error conditions occur in a band that is being used by the devices, when a clean channel is detected, in response to a request to change to the new contention free channel is sent to the wireless display, and so on. In addition, beam forming may be used to reduce power requirements and minimize the RF Channel footprint for a given segment or spatial area.

In one or more implementations, a receiving device such as a wireless display may provide requests to a source device to change to a different channel. In response, the source may tell the receiving devices (e.g., sinks) to which channel the device is to move. In this way, the source may drive multiple receiving devices in a contention free manner, although other implementations are also contemplated in which the receiving device is used to manage communication. For example, in scenarios in which multiple sources are driving into a single sink this could be reversed or a master source could be defined amongst the sources that specifies which channel to use for wireless communication, e.g., A/V transactions. In another example, the receiving device may be made aware as to which data is missing (e.g., media frames) and provide a recommendation to the sending device to change to a new channel once a given threshold is exceeded.

Figure 11:
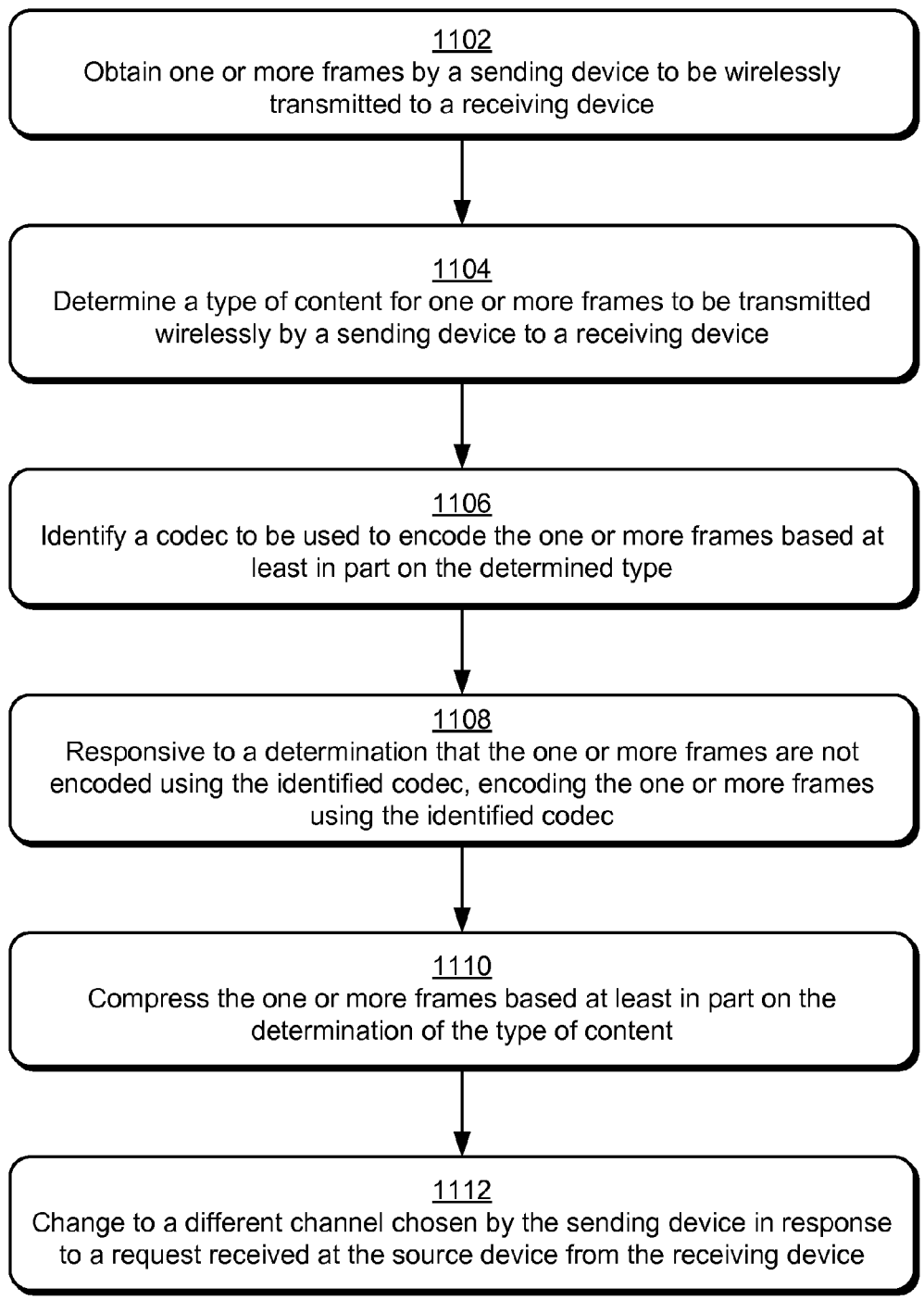
FIG. 11 is a flow diagram depicting a procedure in an example implementation of wireless communication techniques that relate to wireless encoding and decoding techniques.

FIG. 11 depicts a procedure 1100 in an example implementation of wireless communication techniques that relate to communication of frames. The following discussion describes techniques that may be implemented utilizing the previously described systems and devices. Aspects of each of the procedures may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 1000 of FIG. 10.

One or more frames are obtained by a sending device to be wirelessly transmitted to a receiving device (block 1102). The frames, for instance, may be generated by an application that is executed locally by the computing device 112, from local storage of the computing device 112, obtained remotely via a network, and so on.

A type of content is determined for one or more frames to be transmitted wirelessly by a sending device to a receiving device (block 1104). For instance, the frames may be involved in streaming video, part of a presentation, include scenes from a video game, obtained via a browser, part of execution of an application (e.g., a user interface), from a video camera, and so forth. Accordingly, each of these types may have specific characteristics that may be leveraged to reduce power consumption, noise and interference, and so on that may be involved in wireless communication of the frames. The determination may be performed in a variety of ways, such as based on a frequency profile, frequency gradients, temporal changes, edge change detection, and so forth.

A codec is identified to be used to encode the one or more frames based at least in part on the determined type (block 1106). Responsive to a determination that the one or more frames are not encoded using the identified codec, the one or more frames are encoded using the identified codec (block 1108). Continuing with the previous example, some types of codecs may be particularly suited for encoding particular types of frames. For gaming, for instance, a H.264 codec may be used to encode the frames. For user interfaces that support object-like manipulation, wireless traffic may be reduced by sending objects and animation control versus sending data for each frame. For scenarios like Internet browsing, motion JPEG may be an alternative to preserve quality and data traffic. A variety of other examples are also contemplated.

The one or more frames may also be compressed based at least in part on the determination of the type of content (block 1110). For example, a codec or compression algorithm may also be chosen based on characteristics of the wireless channels that are used to transmit the data. Further, this choice may be performed at a variety of time frames, such as at a per frame or sub-frame basis.

The sending device may also change to a different channel chosen by the sending device in response to a request received at the source device from the receiving device (block 1112). For example, a receiving device (e.g., a wireless display device) may determine that there is a large amount of noise on a current channel and therefore send a communication to the sending device (e.g., a mobile device) to change the channel used to communicate with the sending device. The sending device may then choose a new channel and communicate this information back to the receiving device. Thus, in this example the sending device manages the wireless communication although other examples are also contemplated.

A variety of other wireless communication techniques are also contemplated, such as to dynamically adjust a compression ratio, an amount of change, change from one codec to another, beam forming, FEC (Forward Error Correction) and so on.

Mobile Device Wirelessly Sharing a Screen with Other Devices

Mobile communication devices have become increasing powerful and capable of being highly connected and capable of acting as relatively large storage devices capable of complex tasks from gaming to photo editing. However, even though display devices employed by mobile communication devices have grown from average sizes below three inches in diagonal to close to four inches, pan and zoom may still be involved when reading typical web pages, emails, and so on. These devices are also typically limited in an ability to input content or control applications with limited on-screen or small keyboards on these devices. Accordingly, techniques are described that may be used to enhance the input and output of the mobile communication device in circumstances where a second display and/or input device is available.

In one or more implementations, the mobile communication devices may "remote" its display and input mechanism (e.g., touch, buttons, and so forth) to a simple display device via wireless display for the screen content and a control back channel. This may be used to support a variety of different modes of operation:

1) Simple remote usage where the user simply sees a larger device similar to tablet device. However, in this case, there is no separate processor, memory, WAN communications, and so on thereby allowing a lower cost, increased mobility, and ability to synchronize. The experience may also be enhanced by allowing a higher resolution display to be supported on the remote device via scaling or direct rendering to the larger size.

2) The remote screen can be used as a display device, and the phone with a copy (clone) on the display is used such that control is accomplished from the phone.

3) The remote screen can act as a secondary display, and the phone can display different content, contextual content, keyboards, and so on. Control may occur from both the remote display and phone.

In the first cases, the phone may stay in one's pocket. In cases 2) and 3) the remote may sit on a surface, located in a dock, physically connected to the phone, and so forth.

A variety of different functionality may be supported by these techniques, such as an ability to remote phone interface via optimized wireless display mechanisms (e.g., optimized link, remote UI, animation, and display compression) where applications can run completely on the phone, but interfaced to the user on the remote display. Additionally, compressed videos may be embedded to be natively decoded by remote display, remotely execute UI animation, and adjust decoding based on content on remote side.

Further, touch (e.g., multiple finger gesture) and button clicks may be embedded into a reverse channel of the mobile communication device, and these commands may be replayed as if they were natively executed on the mobile communication device. A conversion may also be made on the remote device to convert touch points from remote coordinates to native coordinates on the mobile communication device. Further, these techniques may leverage integrated Wi-Fi/decoder solution which provides communications, content decoding, embedded frame buffer solution, and controller that is cost efficient.

Traditionally, customers would either use their phone or laptop for everything from web browsing to games to reading email. Recently, however, a third device commonly referred to as a "tablet" have become popular that have a screen size between phones and laptops, higher battery life than both, touch interfaces and applications similar to smart phones, and thickness similar to smart phones. These devices allow users a third choice, but may have significant costs (e.g., both device and carrier costs), synchronization issues, and in some cases significant user interface differences. The proposed solution allows customers the option to have an internet tablet at significantly lower costs, which is synchronized with their smart phone, and provides a common user interface.

The solution may leverage techniques to identify, connect, encode, transmit, and decode/display remotely. Standards such as 802.11, Wi-Fi Direct, uPNP, H.264, Motion JPEG, and so on may be leveraged.

To build a remote tablet, a small portion of a typical internet tablet may be used to construct a "thin" device. For example, the tablet may be manufactured without an applications processor, large flash or DRAM, WAN modem, and so on. Further, the remote tablet may employ a relatively smaller battery, have Wi-Fi, similar display, and leverage decoders and a relatively small controller yet still provide a majority of typical internet tablet functions. The remote display, when using the phone as the source device, may be able to provide this experience however on a larger display. If one excludes the display, these costs can represent between twenty and fifty percent of the typical electrical bill of materials of an internet tablet.

Further, the return channel may be employed for set-up and acknowledgement of packets. As events from a touch controller or buttons occur, these come to the small controller to be translated and encoded. These may then be sent to the mobile communication device to avoid latency between displayed objects and touch events. Once received, the mobile communication device may decode these events as if received from its touch controller. For dual screen scenarios, the touch events may be received as second touch controller.

Wi-Fi beacon signals or BT may also be used to allow wake up of the mobile communication device from the remote device. Power may also be shut-down on both sides after user controllable time periods of in-operation.

Further, the mobile communication device's graphics processing unit may be used to render not only to the local display size, but also to a larger resolution allowing better viewing of applications, web content, and so forth.

Negotiation between mobile communication device and the remote tablet may be used to identify which compression types are permitted. For example, applications may have their rendered content encoded in either H.264 or motion JPEG after a frame has been completed. In this example, the application is not made aware that the frame is being transmitted for remote viewing. For cases where a media player is used (or an embedded media player like in a web page is called), the encoded media stream may be captured before being decoded on the mobile communication device. The stream is then encapsulated, and sent to the remote device to either be decoded either within a graphics frame decoded and merged or simply decoded full screen. Other types may also be more efficiently encoded/decoded based on data type, but this may involve greater awareness by applications of the remote device and potentially more costs in the remote device. Audio streams may also be embedded in either direction to support applications like conference calls, media playback, and voice commands.

Mobile Device Broadcast to Multiple Wireless Displays

To display content on multiple displays using traditional techniques involved the use of splitters, and cables that were routed to individual displays. This presents a problem of setup difficulties and this solution is meant to address this problem. Traditional wireless solutions (e.g., over short to medium distances) do not support broadcasting to multiple displays. This solution allows a mobile communication device to broadcast its content wirelessly to multiple devices.

The mobile device (e.g., which may also be referred to as a source device) using the techniques described herein is capable of broadcasting its content (whether it is an audio/video, pictures, data, screen display, or others) to multiple wireless displays (shall now be known as sink devices) at the same time. In this way, broadcasting of content from a source device to multiple sink devices at the same time may be supported.

For example, a user may initiate the broadcast feature on the source device and select which sink devices to which the content is to be broadcast. The user may then select multiple sink devices within range of the source device. Once the links between the source device and the sink devices are established, the user can then choose the content on the source device to be broadcast. For instance, the user may select to broadcast the source device's screen content to the sink devices. In this case, if the user is playing an audio/video content on the source device, while it's content is also broadcast to the sink devices. Upon reception of the content, the sink devices may then display the content of the source device. The links between the source device and sink devices may be bidirectional to allow the handling of packet errors, link controls, data transport, service establishments, and so forth.

Mobile Device Wireless Screen Share with Other Devices

This technique allows a user to share screen content of a device (whether it be pictures, audio/video, data, etc.) with multiple devices when the link between the devices are established. This allows other devices to display the shared content along side with the local content on the device.

For example, the mobile device (shall now be known as source device) is capable of wirelessly screen sharing its content (whether it is an audio/video, pictures, data, screen display, or others) with other devices (shall now be known as sink devices) and vice versa. This allows the sink device to view its local content and the shared content. The shared content screen size can be adjusted on the sink device. Thus, a variety of different functionality may be supported by these techniques:

Wirelessly share screen content from a source device to multiple sink devices when the devices are within their wireless range.

Allow the sink device to view the local content and shared content.

Shared content screen size is adjustable on the sink device.

The devices are not limited to laptops, desktops, wireless display, tablets, slates, and mobile devices. The source device may be defined as a device providing content to be shared. The sink device may be defined as a device receiving the shared content. During a screen sharing session, multiple sink devices may be allowed but a single device is designated as a source.

In this context, the user initiates the screen sharing session on each of the devices. One of the devices is specified as the source device, and the other devices are configured to be the sink devices. Upon establishing the screen sharing session between the devices, the sink device can display the shared content on its screen.

The shared content screen size on the sink devices can be configured by the user to full screen (maximize size) or restored screen (adjustable size). During the screen sharing session, any one of the sink devices can become the source device by requesting role changes. Upon final negotiation of the role changes, the devices are reconfigured accordingly and the new content sharing begins.

Mobile Device Audio Synchronization with a Wireless Display

When a device provides a video stream to a wireless display, while the end user is listening to the audio at the device end, the audio and video may be out of sync. This may be due to latency in the compression, transmission and decompression which varies depending on RF environment and video processing.

To enhance the audio & video (A/V) synchronization when the source device is providing content to a wireless display while the audio content is being played locally, a mechanism may be employed to dynamically synchronize the A/V content. For example, an audio buffer and/or stream may be used that dynamically adjusts the play point and/or rate to account for the system latency to ensure the audio at the source is synchronized with the video at the remote end point.

There are a variety of different mechanisms that may be utilized. For example, if the source device supports a microphone the audio buffer control system may compare a test tone being received locally by that originating from the display. The tone, for instance, may be implemented as a relatively short burst outside the human acoustic range and/or imperceptible short duration. The control system may then measure the latency and adjust the audio buffer play state and/or rate appropriately to align the A/V.

In another example, the source device may transmit a RF timing packet to the end point at the display. The end point may then respond and the source devices may measure the RF delay. The round trip time coupled with the known or estimated encode & decode latency may be summed together to provide the total system latency measure for packet latency. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
a first module that is configured to communicate over a first band for wireless communication;
a second module that is configured to communicate over a second band for wireless communication; and
a communication manager module that is configured to manage simultaneous wireless communication over the first and second bands using the first and second modules and manage an amount of power utilized by the first and second modules to communicate over the first and second bands based on a determination indicating whether a receiving device is within a predefined distance and a determination of a minimal power level that supports communication with the receiving device over at least one of the first and second bands, the minimal power level determined, in part, based on whether a component employed to perform aspects of the simultaneous wireless communication over the first and second bands is bypassed using one or more other components that consume less power.

2. An apparatus as described in claim 1, wherein the first module is configured to communicate over a 2.4 GHz band and the second module is configured to communicate over a 5.0 GHz band.

3. An apparatus as described in claim 1, wherein the communication manager module is configured to utilize the first module and corresponding first band to communicate control information and the second module and corresponding second band to communicate data.

4. An apparatus as described in claim 1, wherein the communication manager module is configured to utilize a wireless channel within the first band for audio/visual data and associated control information and another wireless channel for other wireless networking traffic.

5. An apparatus as described in claim 1, wherein the communication manager module is configured to utilize a wireless channel within the first band for wireless display data and another wireless channel for access point internet data.

6. An apparatus as described in claim 1, wherein the communication manager module is configured to utilize beacon signals to interleave a transmission for wireless display by a wireless display device.

7. An apparatus as described in claim 1, wherein the communication manager module is configured to handle a plurality of independent orthogonal frequency division multiplexing (OFDM) streams using the first and second modules.

8. An apparatus as described in claim 1, wherein the communication manager module is configured to employ time-division multiplexing between the first and second bands.

9. An apparatus as described in claim 1, wherein the communication manger module is configured to manage the amount of power utilized by varying the amount of power used by the first or second modules based on whether communications between the receiving device and the apparatus comply with a predefined link quality.

10. An apparatus as described in claim 9, wherein the predefined link quality is based at least in part on an error rate or a scan of the channels during one or more non-transmit cycles.

11. One or more computer-readable memories comprising instructions that, responsive to execution by one or more processing devices, implement a communication manager module configured to perform operations comprising:

employing a first module to communicate over a first band for wireless communication;

employing a second module to communicate over a second band for wireless communication simultaneously with the first module to enable simultaneous wireless communication over the first and second bands;

managing an amount of power utilized by the first and second modules to communicate over the first and second bands separately based on a determination for each of the first and second modules indicating whether a respective receiving device configured to communicate over the corresponding first or second band is within a predefined distance; and managing an amount of power utilized by other components that enable the simultaneous wireless communication to be performed at a minimal power level that supports communication with the respective receiving device, including bypassing at least one of the components, configured to perform aspects of the simultaneous wireless communication, using one or more substitute components when the substitute components are determined to consume less power to perform those aspects of the simultaneous wireless communication.

12. One or more computer-readable storage media as described in claim 11, wherein the operations further comprise employing the first module to communicate over a 2.4 GHz band and the second module to communicate over a 5.0 GHz band.

13. One or more computer-readable memories as described in claim 11, wherein the operations further comprise employing the first module and corresponding first band to communicate control information and the second module and corresponding second band to communicate data.

14. One or more computer-readable memories as described in claim 11, wherein the operations further comprise utilizing a wireless channel within the first band for audio/visual data and associated control information and another wireless channel for other wireless networking traffic.

15. One or more computer-readable memories as described in claim 11, wherein the operations further comprise utilizing a wireless channel within the first band for wireless display data and another wireless channel for access point internet data.

16. One or more computer-readable memories as described in claim 11, wherein the operations further comprise utilizing beacon signals to interleave a transmission for wireless display by a wireless display device.

17. One or more computer-readable memories as described in claim 11, wherein the operations further comprise employing the first and second modules to handle a plurality of independent orthogonal frequency division multiplexing (OFDM) streams.

18. One or more computer-readable memories as described in claim 11, wherein the operations further comprise employing the first and second modules to enable time-division multiplexing between the first and second bands.

19. A method comprising:

employing a first module of a communication device to communicate over a first band for wireless communication;

employing a second module of a communication device to communicate over a second band for wireless communication simultaneously with the first module to enable simultaneous wireless communication over the first and second bands; and managing an amount of power utilized by the first and second modules to communicate over the first and second bands based on a determination of a minimal power level that supports communication with the receiving device, the minimal power level determined based on both whether a component employed to perform aspects of the simultaneous wireless communication is bypassed using one or more other components that consume less power to perform the aspects and whether power output to communicate over at least one of the first and second bands is adjusted according to a distance from the receiving device.

20. A method as described in claim 19, wherein the first band corresponds to a 2.4 GHz band and the second band corresponds to a 5.0 GHz band.

* * * * *